United States Patent [19]

Hirayama

[11] Patent Number: 5,673,406
[45] Date of Patent: Sep. 30, 1997

[54] PORTABLE INFORMATION PROCESSING APPARATUS HAVING SIMPLIFIED PAGE SELECTION

[75] Inventor: Tomoshi Hirayama, Tokyo, Japan

[73] Assignee: Sony Corporation, Tokyo, Japan

[21] Appl. No.: 702,794

[22] Filed: Aug. 26, 1996

Related U.S. Application Data

[63] Continuation of Ser. No. 678,004, Apr. 1, 1991.

[30] Foreign Application Priority Data

Mar. 30, 1990 [JP] Japan ............... 2-84314

[51] Int. Cl.$^6$ .............................. G06F 17/00
[52] U.S. Cl. .............................. 395/350
[58] Field of Search .................. 395/146, 148, 395/155, 156, 157, 158, 159, 161, 350

[56] References Cited

U.S. PATENT DOCUMENTS 4,517,598  5/1985  Van Valkenburg et al. .......... 358/142
4,805,119  2/1989  Maeda et al. ..................... 364/518
4,965,558  10/1990  Saki et al. ....................... 340/712

FOREIGN PATENT DOCUMENTS

WO 89/01658  2/1989  WIPO .

*Primary Examiner*—Mark K. Zimmerman
*Attorney, Agent, or Firm*—Hill, Steadman & Simpson

[57] ABSTRACT

An information processing apparatus is comprised of a processing circuit for processing information in a unit of pages, the information being classified into the same kind of pages as index informations, a display device for displaying class of the index information, and a pointing device for pointing the class of index information on the display device. The processing circuit processes the information such that, when the pointing device points to the displayed index information, the first page or a new page in the class of index information is displayed.

5 Claims, 8 Drawing Sheets

PORTABLE INFORMATION PROCESSING APPARATUS HAVING SIMPLIFIED PAGE SELECTION

This is a continuation of application Ser. No. 07/678,004, filed Apr. 1, 1991.

BACKGROUND OF THE INVENTION

1. Field of the Invention

The present invention relates generally to information processing apparatus and, more particularly, is directed to an information processing apparatus such as a portable computer in and/or from which data are input and/or output by a pen and which can access data readily.

2. Description of the Prior Art

A conventional computer (hereinafter referred to as a central processing unit (CPU)) or the like generally utilizes a program in which a lot of data to be stored in a memory are stored in the form of pages or cards. In the data stored in the form of pages, predetermined data are filed at every page, while in the data stored in the form of cards, although predetermined data are filed as one data group, these data are retrieved independently. In the following description of this specification, of data stored in the form of pages and in the form of cards, sets of data of the same kind are treated as data managed at every index. When predetermined data of the data thus managed at every index is retrieved and data written therein is read out, pages must be turned. Further, when new data is written, a blank page must be opened. Considering a certain notebook in which data are managed at every index, such notebook has blank portions together with pages in which data are already written. If predetermined data is written in the blank portion, pages must be turned to this blank portion. If this page turning operation is carried out in a portable computer and if data managed at every index of 30 pages must be turned, then page turning operations must be carried out 29 times in worst cases. In order to avoid such cumbersome key operation, it is proposed to provide an additional write mode key, wherein the last page is opened by the depression of this write mode key. Another proposal is that [first key], [last key] or the like are provided to open the first or last page of data managed at every index by the depression of [first key] or [last key].

According to the aforenoted conventional apparatus, [first key] or the [last key] must be provided in order to jump the page to the first page or the last page. Particularly, in the conventional apparatus in which data are administered at every index, [first key] or the [last key] must be provided at every index to increase the number of keys, which unavoidably makes the apparatus become difficult to handle.

OBJECTS AND SUMMARY OF THE INVENTION

Accordingly, it is an object of the present invention to provide an improved information processing apparatus which can eliminate the aforenoted shortcomings and disadvantages encountered with the prior art.

More specifically, it is an object of the present invention to provide an information processing apparatus in which a blank write page can be retrieved with ease.

It is a further object of the present invention to provide an information processing apparatus in which the number of keys can be reduced and whose arrangement can be simplified.

It is an additional object of the present invention to provide an information processing apparatus which can be applied to a portable computer.

As a first aspect of the present invention, an information processing apparatus is comprised of a processing circuit for processing informations in a unit of pages, the informations being classified into the same kind of pages as index informations, a display device for displaying class of the index information, and a pointing device for pointing the class of index information on the display device, wherein the processing circuit processes the information such that, when the pointing device points the displayed index information, the first page or a new page in the class of index information is displayed.

In accordance with a second aspect of the present invention, an information processing apparatus is comprised of a processing circuit for processing informations in a unit of pages, the informations being classified into the same kind of pages as index information, a pointing device for pointing a key, a detecting device for detecting whether the key is operated by the pointing device or not, a page judging device for judging a class of index information of a real displayed page, and a page changing device for changing a displayed page, wherein when the first page in the class of index is displayed, the page changing device changes the new page to a displayed page and when the other page thereof is displayed, the page changing device changes the first page or the new page to a displayed page.

The above, and other objects, features and advantages of the present invention will become apparent in the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

An embodiment of the information processing apparatus according to the present invention will hereinafter be described with reference to the accompanying drawings. In this embodiment, the present invention is applied to a portable computer, and prior to describing the present invention with reference to FIGS. 1 to 3, an overall arrangement of the portable computer of the present invention will be described with reference to FIGS. 4 and 5.

Figure 4:
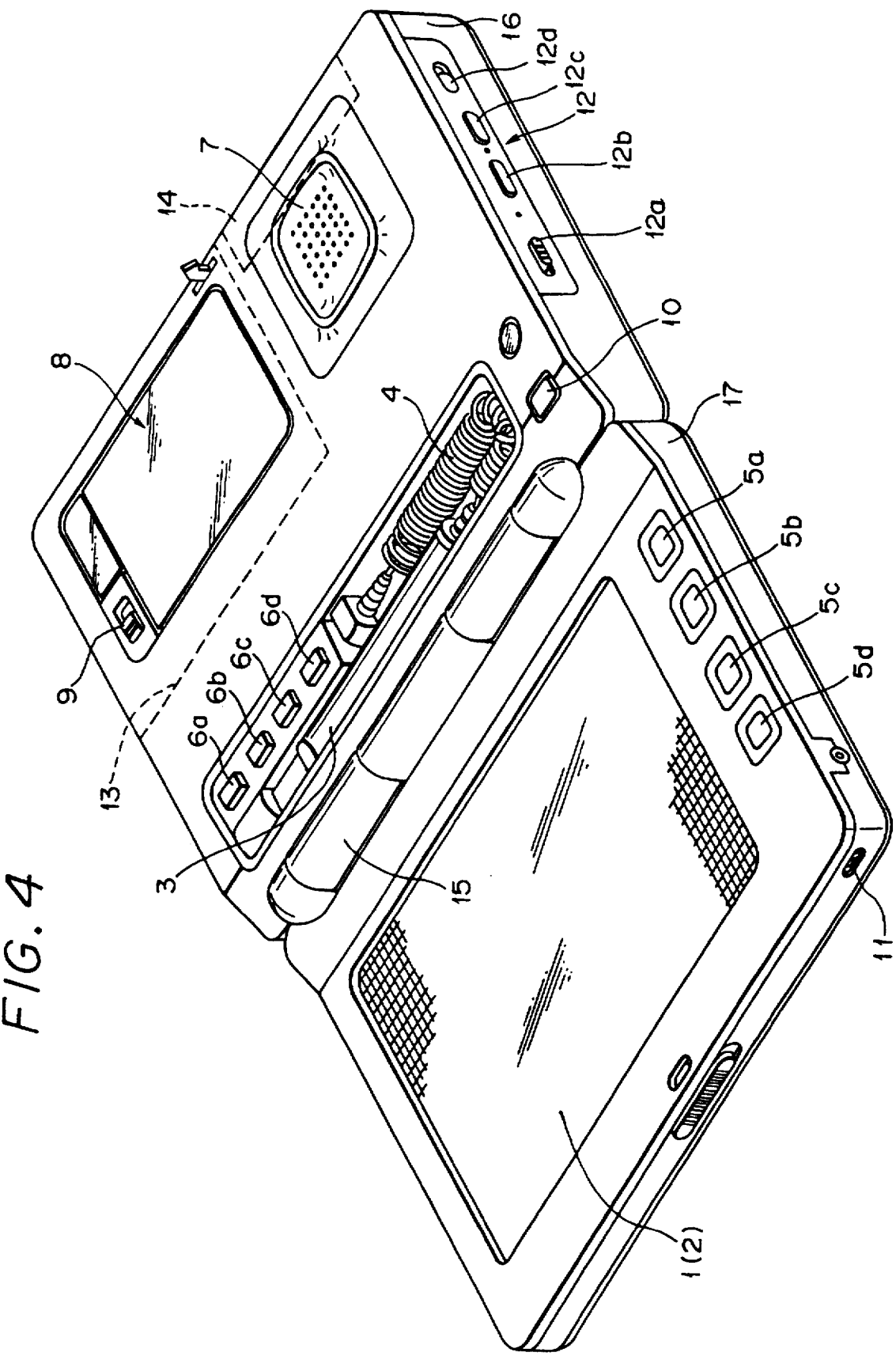
FIG. 4 is a perspective view of an appearance of the portable computer to which the present invention is applied.

Referring to FIG. 4, a display device, i.e., a display unit 1 formed of a liquid crystal display (LCD) device or the like is provided on a left housing 17. The display unit 1 displays on a picture screen thereof video data from a central processing unit (CPU) or the like which will be described later, and an input apparatus, that is, an input tablet 2 formed of a so-called touch sensitive device or the like is attached to the surface of the display unit 1. A pen 3 is used to input arbitrary data or the like in cooperation with the input tablet 2, and the pen 3 and the input tablet 2 have detecting means for sensing the change of electrostatic capacitance between the pen 3 and the input tablet 2. Therefore, even when the point of the pen 3 is not in contact with the input tablet 2, coordinate position can be detected and a cursor also is displayed on the display unit 1 at its position opposing to the point of the pen 3.

When the user picks up the pen 3 and touches the input tablet 2 with the point of the pen 3, informations such as contact condition, contact position or the like are supplied through a cord 4 or the like to the CPU, thereby arbitrary data and others being input to the CPU. Further, reference numerals 5a, 5b, 5c, 5d and 6a, 6b, 6c and 6d designate key switches and signals therefrom are also supplied to the CPU.

Reference numeral 7 designates a speaker unit, and 8 a battery accommodating section in which a power source battery is accommodated in the inside of a lid which is made openable and/or closable by releasing a lock mechanism 9. Further, reference numeral 10 designates a power switch and 11 a microphone. Furthermore, reference numeral 12 denotes an operation key pad for performing a solid state recording which will be described later. This operation key pad 12 is composed of a recording key 12a, a playback key 12b, a stop key 12c and a sound level adjusting key 12d which can adjust the level of sound in high, medium and low. When these keys 12a through 12d are pushed and slid, an audio signal fed to the microphone 11 is recorded and the recorded sound is emanated from the above-mentioned speaker 7. Further, a dashed line block 13 designates a socket into which an IC card such as a read Only memory (ROM), a random access memory (RAM) and so on is inserted, and a dashed line block 14 designates an expansional socket which is used to connect this portable computer to external apparatus or the like. This expansional socket 14 is provided at the side wall of the right housing 16.

Furthermore, reference numeral 15 denotes a hinge which transmitted. By this hinge 15, this portable computer can be folded into two parts without being affected by an electrical interference or the like. In use, this portable computer is about 29 cm long and about 20.5 cm wide in the unfolded state, and is about 4 cm thick in the folded state. The display unit 1 is about 15 cm long and 10 cm wide.

Figure 5:
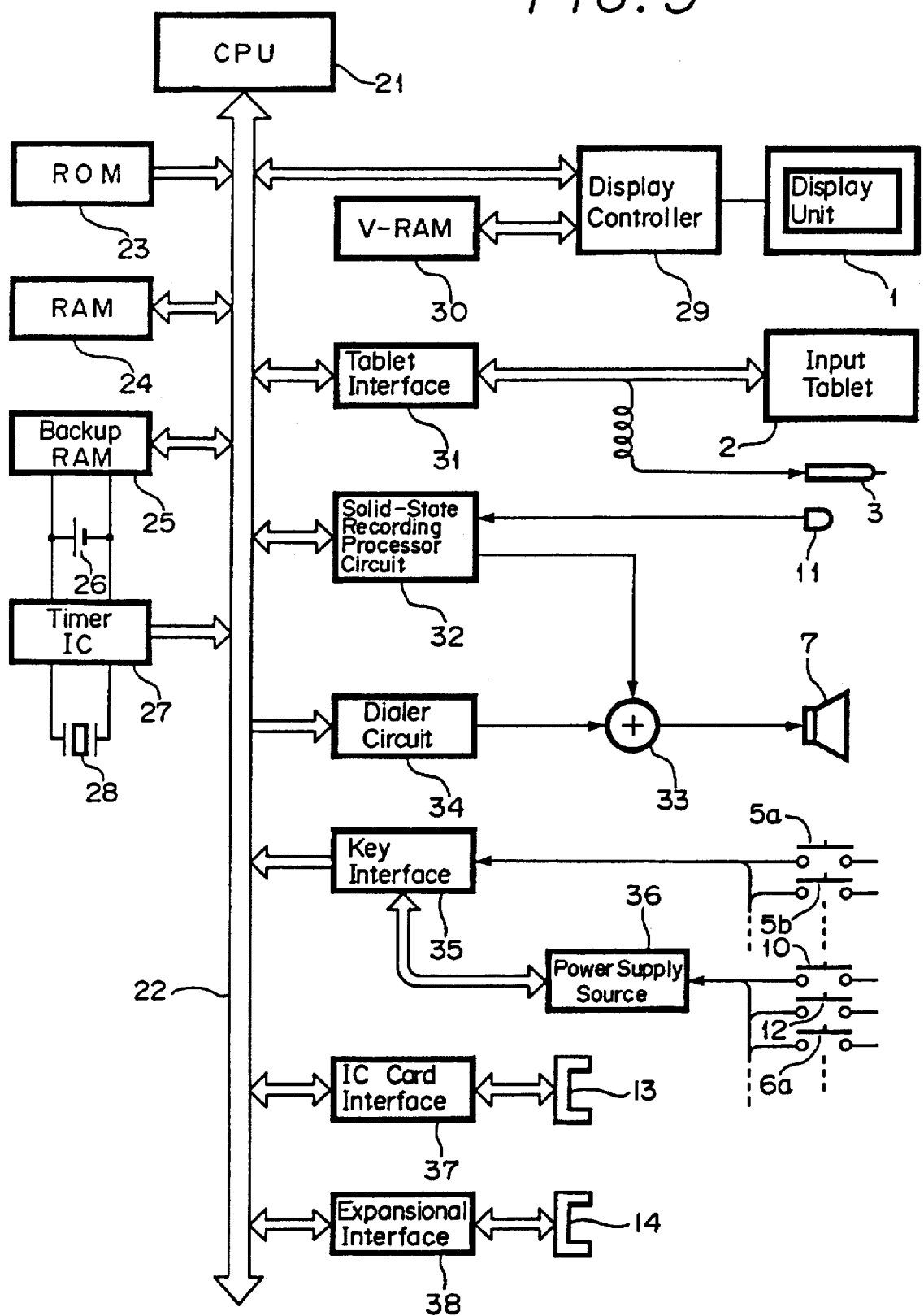
FIG. 5 is a block diagram showing an overall arrangement of the present invention.

In this portable computer, the housed hardware is constructed as shown in FIG. 5.

As shown in FIG. 5, there is provided a CPU 21 to which various function ICs and so on are connected through a bus line 22. A ROM 23 is connected through the bus line 22 to the CPU 21, and, in addition to a system program for controlling the entirety of this portable computer, a Kana-Kanji conversion program for word processing function for Japanese language, dictionary data therefor, hand-written input information recognition program, dictionary data and so on are written in the ROM 23.

Reference numeral 24 designates a RAM for work area and 25 a backup RAM to which a power supply source 26 is connected.

Further, reference numeral 27 designates a timer IC. This timer IC 27 is driven by the power supply source 26 and counts clocks generated from a quartz oscillator 28 to constantly output data of year, month, day and time.

A connection relation between the above-mentioned hardware and respective sections in the perspective view of FIG. 4 will be described with reference to FIG. 5.

Referring to FIG. 5, a display controller 29 is provided to control the display unit 1. This display controller 29 is controlled by the CPU 21, and display data made by the CPU 21 is written in a V-RAM (video-RAM) 30 through the display controller 29. The data written in the V-RAM 30 is supplied through the display controller 29 to the display unit 1.

A tablet interface 31 is provided for the input tablet 2 integrally formed with the display unit 1 and the pen 3, and by way of the tablet interface 31, data or the like written in the input tablet 2 is supplied to the CPU 21.

A solid state recording processing circuit 32 is provided to process the audio signal from the microphone 11 in the predetermined manner such as an analog-to-digital (A/D) conversion or the like. The thus processed signal is stored in the backup RAM 25 through the CPU 21, and audio signal data stored in the backup RAM 25 is supplied to the solid state recording processing circuit 32, in which it is processed in a predetermined manner such as a digital-to-analog (D/A) conversion or the like, the thus processed signal being fed through a mixer 33 to the speaker 7.

Further, reference numeral 34 designates a dialler circuit which generates, when supplied with arbitrary data such as a phone number or the like from the CPU 21, an acoustic signal corresponding to a dual tone signal such as a phone number or the like of a so-called push button phone. This signal is supplied through a mixer 33 to the speaker 7.

A key interface circuit 35 is adapted to receive directly or through a power supply source circuit 36 signals from the above-mentioned key switches 5a to 5d, 6a to 6d, the power switch 10, the key pad 12 or the like. From the key interface circuit 35, a signal converted in a predetermined manner is supplied to the CPU 21. Incidentally, the power switch 10, the key switches 6a to 6d and the key pad 12 except the stop key 12d are connected through the power supply source circuit 36 to the key interface circuit 35. When these key switches are operated, the power supply source circuit 36 is initially activated and then key operation informations are supplied to the key interface circuit 35.

An IC card interface circuit 37 and an expansional interface circuit 38 are interconnected to the bus line 22 and the sockets 13 and 14, respectively.

In the above-mentioned portable computer, the processing for retrieving data in which sets of pages belonging to the same category are managed in the list of index and stored in the V-RAM 30 by the CPU 21 will be described below.

Figure 2A:
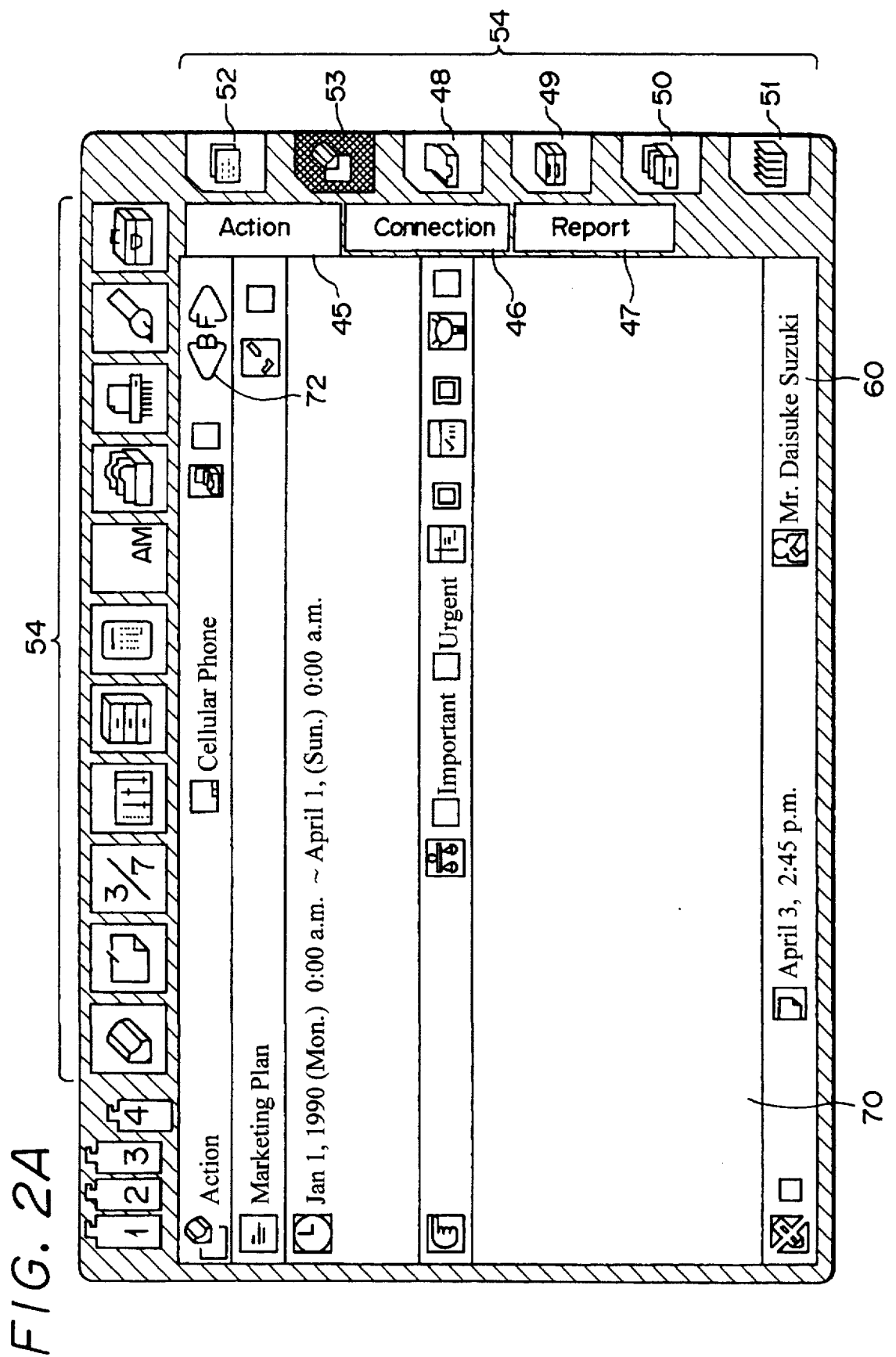
FIGS. 2A to 2D are schematic diagrams, respectively, showing examples of picture screens of a portable computer to which the present invention can be applied, and to which references will be made in explaining operation of the present invention.

When the power switch 10 on the right housing 16 of the portable computer shown the perspective view of FIG. 4 is pushed, an icon group 54 (picture and design used instead of characters as menu on the picture screen of the CRT) is displayed on a hatched region 60 on the picture screen of the display unit 1 as shown in FIG. 2A.

When [WRITE] icon 53 in which a picture of pencil is drawn and which is displayed on the right region of FIG. 2A is touched with the point of the pen 3, characters of ACTION 45, CONNECTION 46, REPORT 47 or the like are displayed on the end of the right region.

Figure 3:
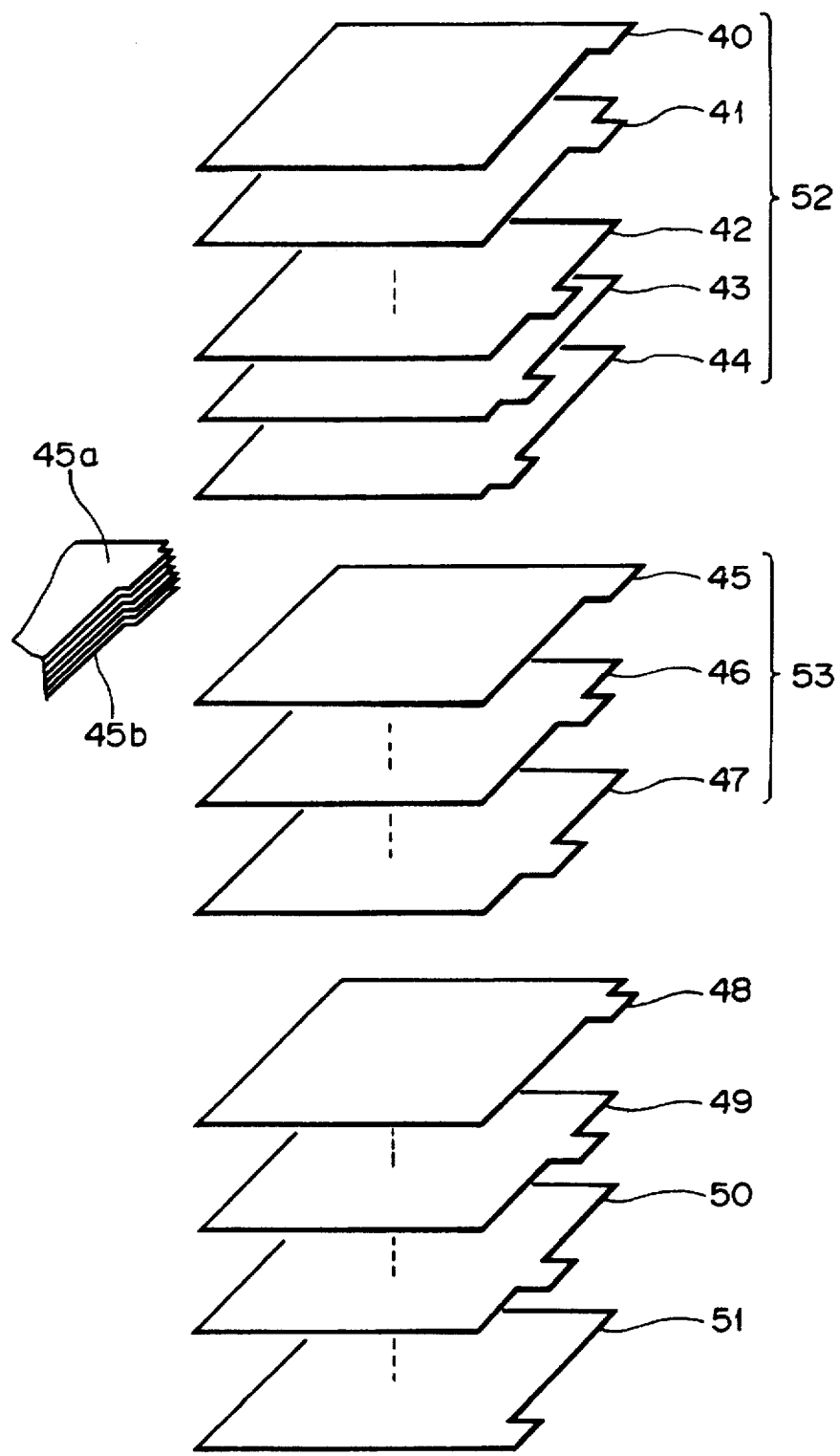
FIG. 3 is a schematic diagram useful for understanding the condition that data are stored in a file-like fashion.

In this embodiment, operation of the portable computer will be described on the assumption that the character portions of ACTION 45, CONNECTION 46 and REPORT 47 are used as index keys. ACTION 45 is mainly used to manage the schedule, CONNECTION 46 is mainly used as address or the like, and REPORT 47 is given a function of simple word processor. Further, [SEE] icon 56 in the icon group 54 arrayed on the right of the region 60 in the longitudinal direction is composed of, as shown in FIG. 3, a day schedule 40, a month schedule 41, . . . , a telephone directory 43, an address book 43, a non-check list 44 or the like and is used to see stored data. [WRITE] icon 53 is composed of ACTION 45, CONNECTION 46, REPORT 47 or the like similarly as shown in FIG. 3 and is used to write something. These icons are each formed of index data composed of sets of pages of the same nature of a plurality of pages, and considering, for example, ACTION 45, a plurality of pages exist between a page 45a of the beginning of action and a last page 45b of action, and nothing is written in the last page 45b. In other words, ACTION 45 has full 29 pages (not paginated), and if a variety of action data are already written in the pages of ACTION 45, then this portable computer automatically produces a last action page of blank page 30 and therefore action data are filed as data of 30 pages managed at every index. PROCESSING icon 48, RESERVE icon 49, OTHERS icon 51 and so on are constructed as layer structures at every index and managed as schematically shown in FIG. 3.

A page turning operation of the above-mentioned portable computer in this embodiment will be described with reference to FIGS. 1 and 2.

Figure 1:
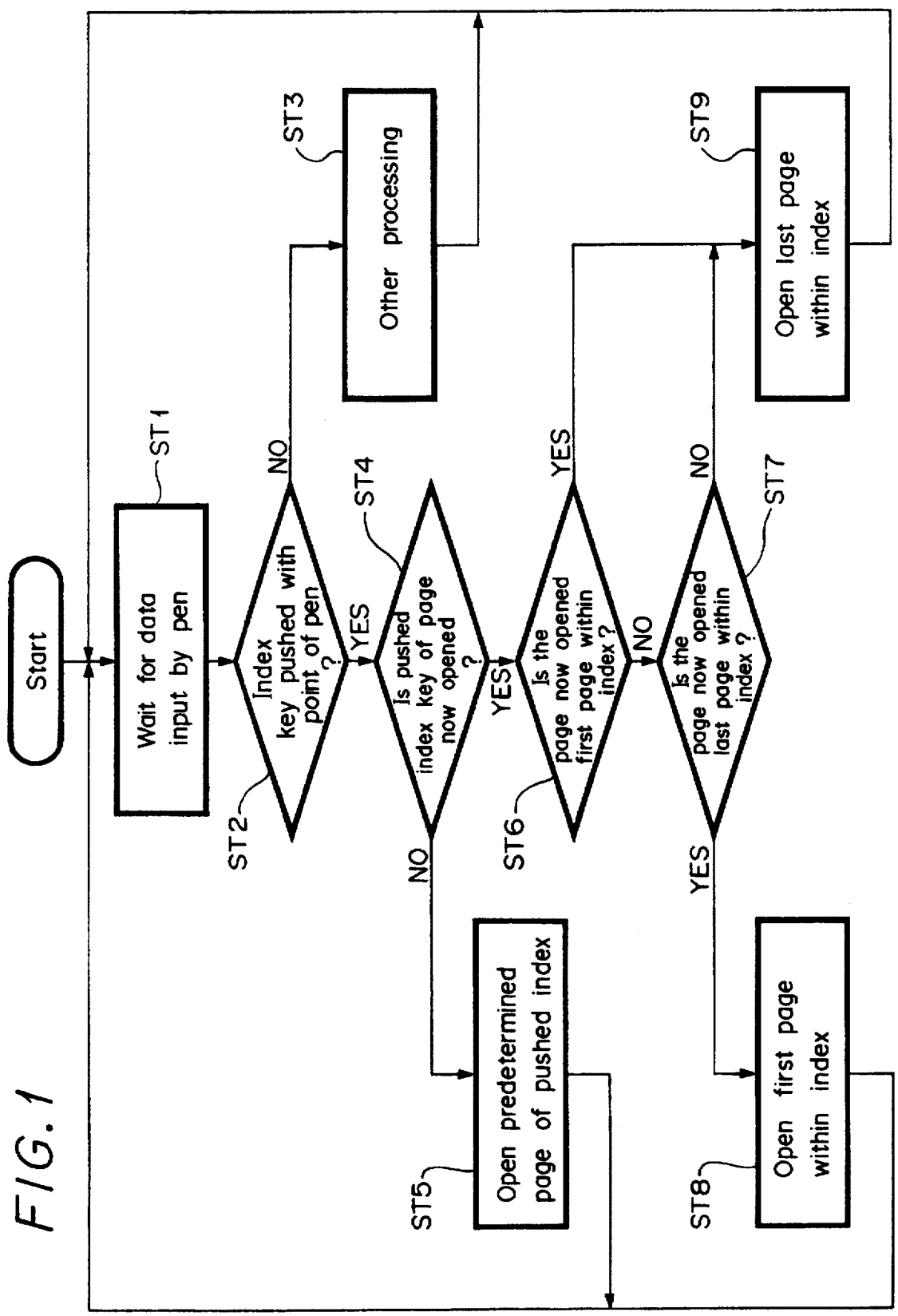
FIG. 1 is a flowchart to which references will be made in explaining operation of an embodiment of the present invention.

Referring to FIG. 1, following the Start of operation, in step ST1, the CPU 21 waits for the input of data, and in the next decision step ST2, it is determined whether or not index keys such as ACTION 45, CONNECTION 46, REPORT 47 or the like is touched with the point of the pen 3. If the index key is not touched with the point of the pen 3 as represented by a NO at decision step ST2, then other processing is executed at step ST3 and the processing returns to step ST1 wherein the CPU 21 waits for the input of data.

If on the other hand any one of the index keys is touched with the point of the pen 3 as represented by a YES at decision step ST2, then the processing proceeds to the next decision step ST4. It is determined at decision step ST4 whether or not the pushed index key is the index key of the page which is now opened. If the page of action picture 70 is opened and CONNECTION 46 of the index key is touched with the point of the pen 3 as represented by a NO at step ST5, then the processing proceeds to step ST5, whereat a predetermined page of the pushed index is opened. That is, in this case, the page of CONNECTION is opened and the processing proceeds to the first step ST1, wherein the CPU 21 waits for the input of data. In the ACTION picture 70 shown in FIG. 2A, a schedule time is Jan. 1. 1990 and let it be assumed that the action page be page 18 in 30 pages. If it is determined in step ST4 that the area of the ACTION 45 is touched as the index key with the point of the pen 3, then the CPU 21 proceeds to step ST6, wherein it is determined whether or not the page now opened is the first page within the index key. If the page now opened is not the first page within the index key but the page 18 as shown in FIG. 2A as represented by a NO at step ST6, then the processing proceeds to the next decision step ST7. It is determined at decision step ST7 whether or not the page now opened is the final page within the index key. If the page now opened is the last blank page as shown in FIG. 2C, then the processing proceeds to step ST8, wherein an action PICTURE 70C provided within the index to indicate the first page as shown in FIG. 2D is opened. If the page now opened is the first page within the index as represented by a YES at step ST6 and if the page now opened is not the last page within the index as represented by a NO at step ST7, then the page is jumped from the states of FIGS. 2A and 2B to the state of FIG. 2C as shown at step ST9. After the step ST9 is finished, the processing returns to the step ST1, in which the CPU 21 waits for the input of data.

Figure 2B:
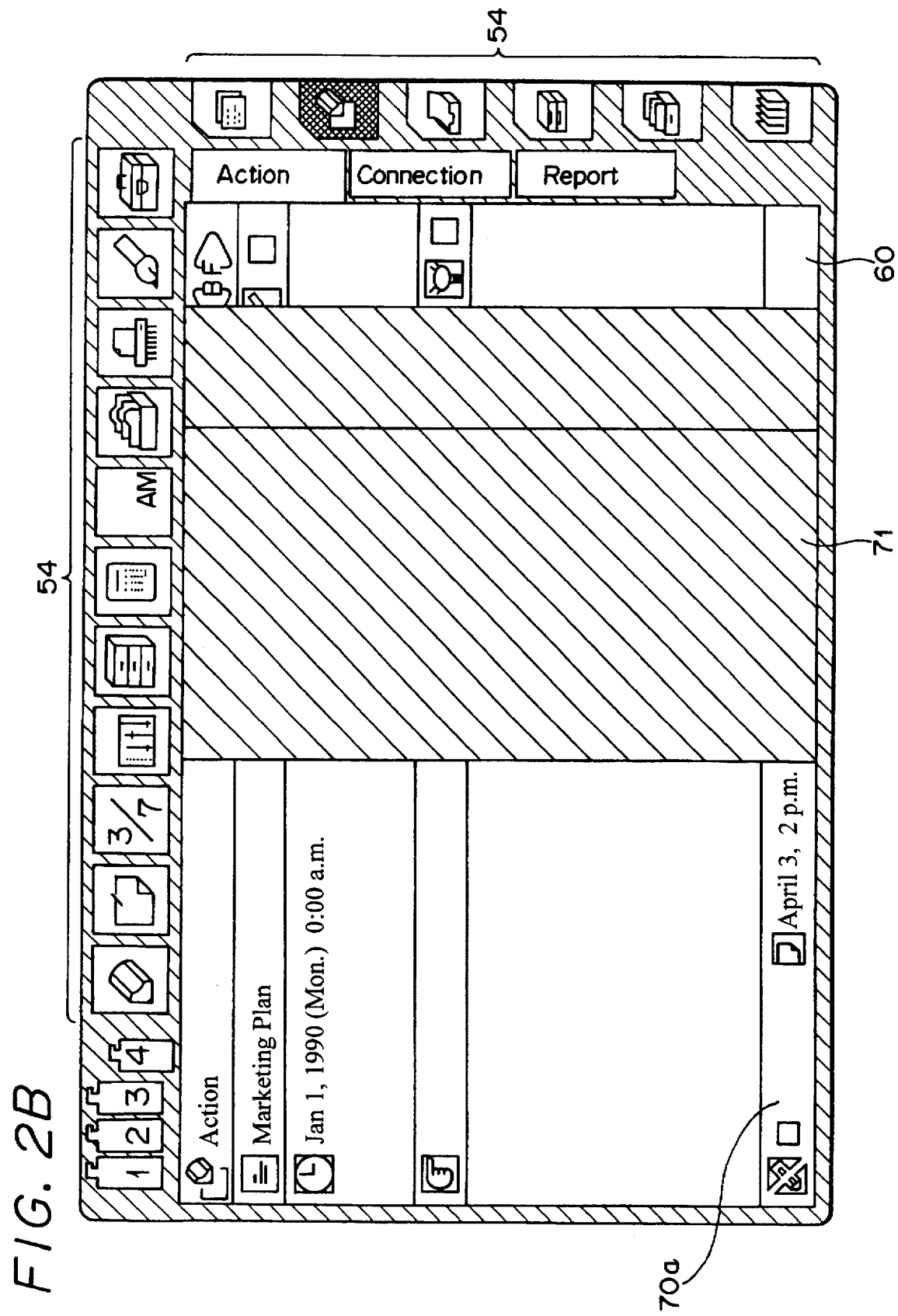
Figure 2C:
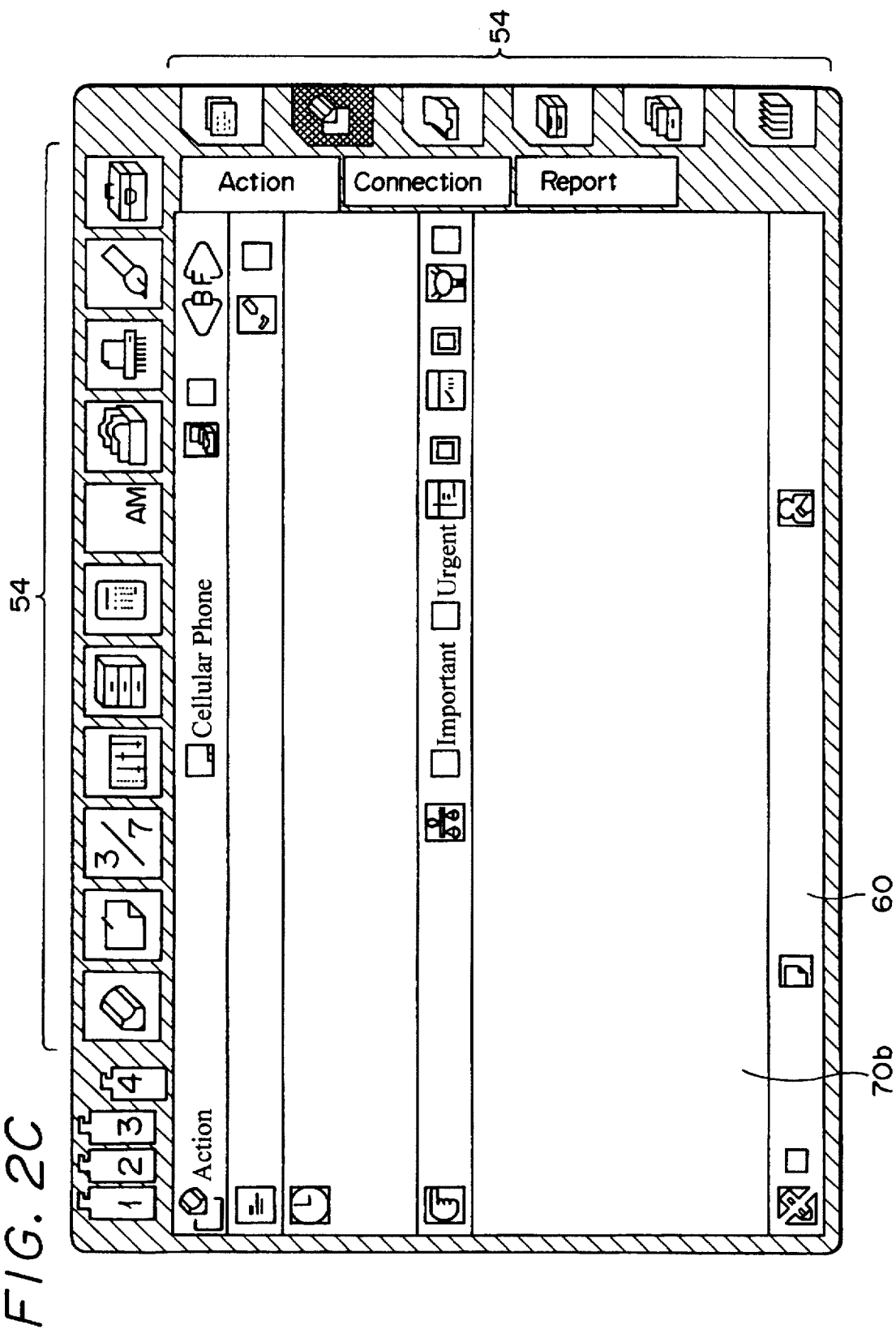
Figure 2D:
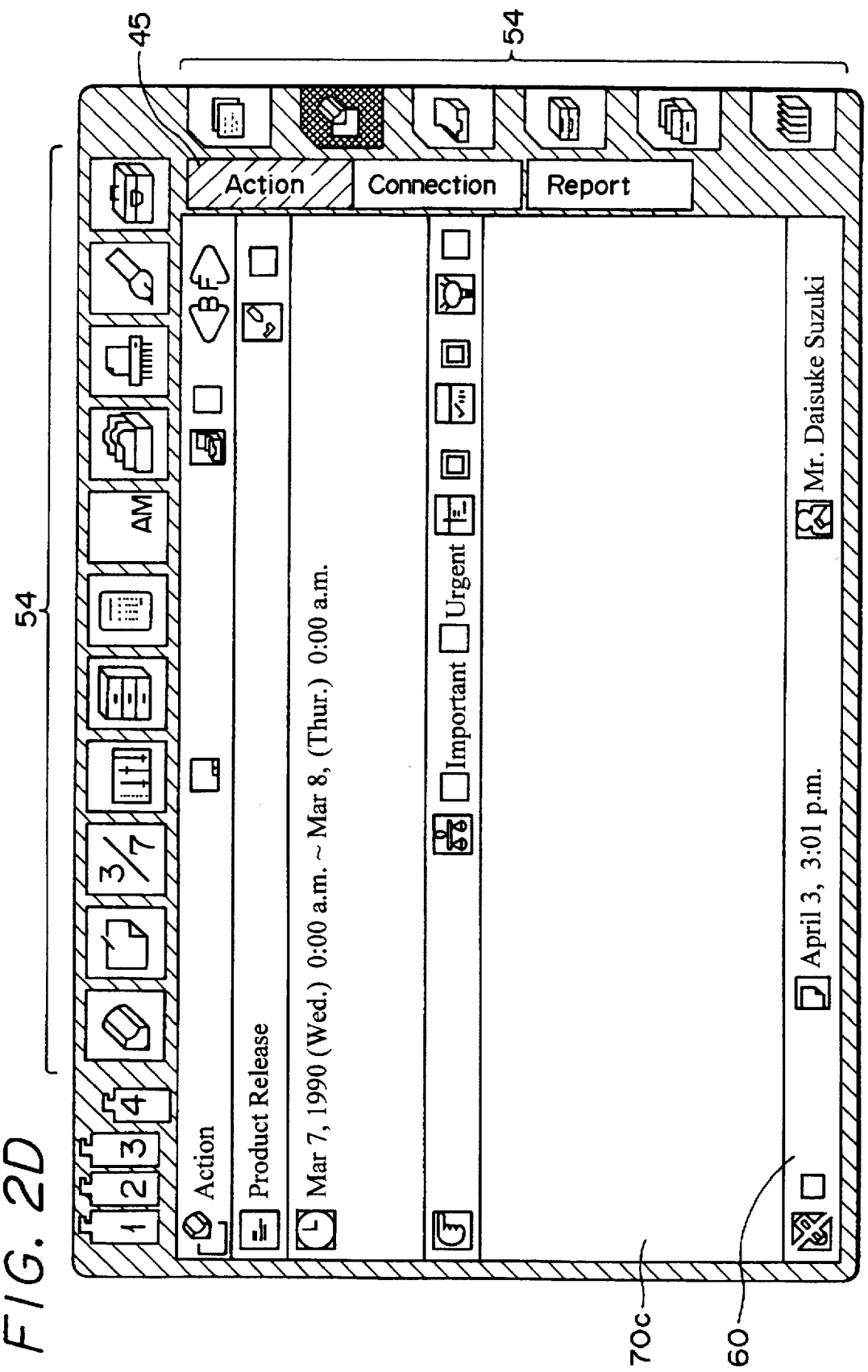

An ACTION picture 70a of FIG. 2B shows a picture displayed at the moment in which the ACTION picture 70 of FIG. 2A is jumped to an ACTION picture 70b of last blank page, and a hatched portion in FIG. 2B shows the moment the page is turned over.

That is, in accordance with this embodiment, when a certain page in the index key of the ACTION 45 is opened, if the index of the ACTION 45 is touched with the point of the pen 3, the page is jumped to the last blank page 45b. Then, if the index key of the ACTION 45 is touched with the point of the pen 3 one more time, the page is jumped to the first page 45a. If the index key of the ACTION 45 is touched with the point of the pen 3 one more time, then the page is jumped to the last blank page 45b. It is needless to say that, if the last or first page is opened, the page may be jumped to the first or last page by one operation of the index key.

Since the page is jumped to the last page of the page group of the same attribute by operating the index key one more time as described above, the user can start the writing immediately from the blank page (the blank page is of course added to the last page of the page group of the same attribute after the writing on the last page is finished and filed as described before). Further, when the first page 45a of the index key of the ACTION 45 is selected, if the backward page turn over key 72 is touched with the point of the pen 3 as shown in FIG. 2A, the last page of the non-check list can be checked because the preceding page is the last page of the non-check list of the [SEE] icon 52 as shown in the schematic diagram of FIG. 3.

According to this embodiment, since the predetermined page opened at every index is jumped to the last blank page by depressing the index key once, the writing column can be immediately opened and the user need not turn over the pages repeatedly. Therefore, as compared with the prior art in which the user must operate the writing key, the user can well understand the simple key operation of the index key of the same attribute. Thus, the information processing apparatus of the present invention requires no extra keys and the arrangement thereof can be simplified.

While the writing operation in this information processing apparatus is described above, the operation of the present invention is not limited thereto and may be applied to the reading operation similarly.

According to the information processing apparatus of the present invention, the number of keys can be reduced and the user can retrieve the writing page with ease.

Having described a preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

I claim as my invention:

1. A portable information processing apparatus having a tablet and a pen pointing means for designating an area of said tablet, comprising:
   processing means for processing information in a unit of pages, said pages displaying information selectively input by said pen, said information being classified into the same kind of pages as index information;
   display means associated with said tablet for displaying a class of said index information shown as a tab of a page; and
   said pointing means operative to point to said class of index information on said display means, wherein said processing means processes said information such that, when said pointing means points to said displayed index information, a first page in said class of index information or a new page having no information is selectively displayed alternately by pointing said pointing means a single time at said class of index information.

2. An information processing apparatus according to claim 1, wherein said processing means creates said new page when said displayed class of index information is newly pointed to.

3. An information processing apparatus according to claim 1, further comprising detecting means for detecting whether said pointing means points to said displayed index information, wherein when said first page is displayed, said processing means processes information to change said new page to displayed page, when said new page is displayed, said processing means processes information to change said first page to displayed page, and when an other page is displayed, said processing means processes information to change said first or new page to displayed page.

4. A portable information processing apparatus having a tablet and pen pointing means for designating an area of said tablet, comprising:

processing means for processing information in a unit if pages, said information being classified into the same kind of pages as index information;

display means for displaying information including key means;

pointing means for pointing to said key means;

detecting means for detecting whether said key means is pointed to by said pointing means;

page determining means for determining a class of index information of a displayed page; and page changing means for changing a displayed page to a new page, wherein when a first page in said class of index is displayed, said page changing means changes said new page to a displayed page and when another page thereof is displayed, said page changing means changes said first page or said new page to a displayed page alternately by pointing said pointing means a single time.

5. A method of selectively accessing information comprising the steps of:

displaying information on a display means, said information including key information;

pointing a pointing means at said key information;

detecting whether said key information is pointed to by said pointing means; and alternately displaying either a first page or a last page of information on said display means by pointing said pointing means at said key information a single time.

* * * * *